United States Patent
Iida et al.

(10) Patent No.: US 10,437,095 B2
(45) Date of Patent: Oct. 8, 2019

(54) CONTINUOUS OPTICAL FILM LAMINATE, ROLL OF CONTINUOUS OPTICAL FILM LAMINATE AND IPS LIQUID CRYSTAL DISPLAY DEVICE

(71) Applicant: NITTO DENKO CORPORATION, Ibaraki-shi, Osaka (JP)

(72) Inventors: Toshiyuki Iida, Ibaraki (JP); Takeharu Kitagawa, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 298 days.

(21) Appl. No.: 15/510,703

(22) PCT Filed: Jun. 24, 2016

(86) PCT No.: PCT/JP2016/068827
§ 371 (c)(1),
(2) Date: Mar. 13, 2017

(87) PCT Pub. No.: WO2017/221405
PCT Pub. Date: Dec. 28, 2017

(65) Prior Publication Data
US 2018/0356679 A1    Dec. 13, 2018

(51) Int. Cl.
*G02F 1/1335*    (2006.01)
*G02F 1/13363*    (2006.01)
(Continued)

(52) U.S. Cl.
CPC ......... *G02F 1/133528* (2013.01); *G02B 5/30* (2013.01); *G02F 1/1335* (2013.01);
(Continued)

(58) Field of Classification Search
CPC ..... G02B 5/30; G02F 1/13338; G02F 1/1335; G02F 1/133528; G02F 1/13363;
(Continued)

(56) References Cited

U.S. PATENT DOCUMENTS

2005/0243245 A1* 11/2005 Taguchi ............... G02B 5/305
    349/96
2006/0062934 A1* 3/2006 Hayashi ................ C08J 5/18
    428/1.31
(Continued)

FOREIGN PATENT DOCUMENTS

CN    104246555 A    12/2014
JP    2002-122740 A    4/2002
(Continued)

OTHER PUBLICATIONS

International Search Report dated Aug. 30, 2016 for PCT/JP2016/068827.
(Continued)

*Primary Examiner* — Sophie Hon
(74) *Attorney, Agent, or Firm* — Hauptman Ham, LLP (57) ABSTRACT

As a result of a reduction in thickness of an IPS liquid crystal display panel, curl has started to occur in a structure where an optical film such as a polarizer or a retardation film is laminated to the IPS liquid crystal display panel. The present invention is directed to thinning a polarizer which is easily expandable and contractable, and thinning a retardation film located between the polarizer and an IPS liquid crystal display panel to enable the polarizer to come closer to the IPS liquid crystal display panel than ever before to thereby prevent curl of the IPS liquid crystal display panel.

9 Claims, 5 Drawing Sheets

(51) Int. Cl.
*G02B 5/30* (2006.01)
*G02F 1/1333* (2006.01)

(52) U.S. Cl.
CPC .... *G02F 1/13363* (2013.01); *G02F 1/133634* (2013.01); *G02F 1/13338* (2013.01); *G02F 2001/133562* (2013.01); *G02F 2001/133567* (2013.01); *G02F 2201/50* (2013.01); *G02F 2202/022* (2013.01); *G02F 2413/02* (2013.01); *G02F 2413/05* (2013.01); *Y10T 428/1036* (2015.01); *Y10T 428/1041* (2015.01)

(58) Field of Classification Search
CPC ... G02F 1/133634; G02F 2001/133562; G02F 2001/133567; G02F 2201/50; G02F 2202/022; G02F 2413/02; G02F 2413/05; Y10T 428/1036; Y10T 428/1041
See application file for complete search history.

(56) References Cited

U.S. PATENT DOCUMENTS

| | | |
|---|---|---|
| 2006/0066787 A1 | 3/2006 | Yoda et al. |
| 2006/0164579 A1 | 7/2006 | Yano |
| 2007/0148485 A1* | 6/2007 | Kusama ................ C09J 133/08 428/520 |
| 2010/0309414 A1 | 12/2010 | Tomonaga et al. |
| 2011/0315306 A1 | 12/2011 | Goto et al. |
| 2012/0052197 A1 | 3/2012 | Sawada et al. |
| 2012/0055607 A1 | 3/2012 | Kitagawa |
| 2012/0055608 A1 | 3/2012 | Kitagawa |
| 2012/0055621 A1 | 3/2012 | Goto et al. |
| 2012/0055622 A1 | 3/2012 | Kitagawa |
| 2012/0055623 A1 | 3/2012 | Kitagawa |
| 2012/0056211 A1 | 3/2012 | Kitagawa |
| 2012/0056340 A1 | 3/2012 | Kitagawa |
| 2012/0057104 A1 | 3/2012 | Kitagawa |
| 2012/0057107 A1 | 3/2012 | Kitagawa et al. |
| 2012/0057231 A1 | 3/2012 | Goto et al. |
| 2012/0057232 A1 | 3/2012 | Goto et al. |
| 2012/0058291 A1 | 3/2012 | Kitagawa |
| 2012/0058321 A1 | 3/2012 | Goto et al. |
| 2012/0081785 A1 | 4/2012 | Iida et al. |
| 2012/0327512 A1 | 12/2012 | Goto et al. |
| 2013/0100529 A1 | 4/2013 | Kitagawa |
| 2013/0114139 A1 | 5/2013 | Kitagawa |
| 2014/0016198 A1 | 1/2014 | Sawada et al. |
| 2014/0044947 A1 | 2/2014 | Sawada et al. |
| 2014/0186568 A1 | 7/2014 | Kitagawa |
| 2015/0022764 A1 | 1/2015 | Takeda et al. |
| 2015/0183199 A1 | 7/2015 | Kitagawa |
| 2016/0025910 A1 | 1/2016 | Sawada et al. |
| 2016/0054494 A1 | 2/2016 | Kitagawa |
| 2016/0103258 A1 | 4/2016 | Kitagawa |

FOREIGN PATENT DOCUMENTS

| | | | |
|---|---|---|---|
| JP | 3687854 | B2 | 8/2005 |
| JP | 2005-345990 | A | 12/2005 |
| JP | 2006-251224 | A | 9/2006 |
| JP | 4751481 | B1 | 8/2011 |
| JP | 4751486 | B2 | 8/2011 |
| JP | 4757347 | B1 | 8/2011 |
| JP | 4804588 | B1 | 11/2011 |
| JP | 4853920 | B2 | 1/2012 |
| JP | 4938632 | B2 | 5/2012 |
| JP | 2012-137695 | A | 7/2012 |
| JP | 2012137695 | A * | 7/2012 |
| JP | 2012-181278 | A | 9/2012 |
| JP | 5244848 | B2 | 7/2013 |
| JP | 2015-011059 | A | 1/2015 |
| KR | 10-2014-0144695 | A | 12/2014 |
| TW | 201403144 | A | 1/2014 |
| TW | 201531752 | A | 8/2015 |
| WO | 2013153961 | A1 | 10/2013 |
| WO | 2015099022 | A1 | 7/2015 |

OTHER PUBLICATIONS

Japanese Office Action dated Jun. 26, 2017 for Japanese Application No. 2015-024318.

* cited by examiner

CONTINUOUS OPTICAL FILM LAMINATE, ROLL OF CONTINUOUS OPTICAL FILM LAMINATE AND IPS LIQUID CRYSTAL DISPLAY DEVICE

CROSS REFERENCE TO RELATED APPLICATION

This application is the National Phase application of International Application No. PCT/JP2016/068827 filed Jun. 24, 2016, which designates the United States and was published in Japanese.

TECHNICAL FIELD

The present invention relates to an optical film laminate obtained by laminating a polarizing plate and a retardation film, which is capable of exhibiting a wide viewing angle, a high polarization degree and good optical durability under humidification, and suitable for an IPS (In-Plane Switching) liquid crystal panel configured to operate in an IPS mode. The present invention also relates to an IPS liquid crystal display device employing such an optical film laminate, wherein the liquid crystal display device is capable of exhibiting a wide viewing angle and good thermal curl (warpage) resistance (curl resistance under heating).

BACKGROUND ART

In an IPS liquid crystal display device configured to operate in an IPS mode, liquid crystal molecules have, in a non-drive state, a homogeneous orientation approximately parallel to a plane of each of a pair of opposed substrates, so that light can pass through a liquid crystal layer almost without a change in polarization plane thereof. Therefore, in the non-drive state, almost perfect black display can be achieved by disposing two polarizing plates, respectively, on upper and lower sides with respect to the substrates. In the IPS mode, almost perfect black display can be achieved when viewing a liquid crystal display panel in a direction normal thereto. However, when viewing the liquid crystal display panel from a direction deviating from the normal direction, light leakage inevitable due to properties of a polarizing plate occurs in a direction deviating from a direction of an optical axis of the polarizing plates disposed on upper and lower sides of a liquid crystal cell, thereby leading to a problem that a viewing angle becomes narrow.

With a view to solving this problem, for example, in JP 3687854B (Patent Document 1), parameters (such as refractive index, retardation and thickness) of an optical film obtained by laminating a polarizing plate and a retardation film such that an absorption axis of the polarizing plate becomes orthogonal or parallel to a slow axis of the retardation value, are set to suitable values for an IPS liquid crystal display panel. In one example, a 20 μm-thick polarizing plate having two 80 μm-thick transparent protective films laminated, respectively, to opposite surfaces thereof using an adhesive, and a 45 μm-thick retardation film, are used.

In JP 4938632B (Patent Document 2), there is described an IPS liquid crystal display device in which a polarizer having a thickness of 10 μm to 50 μm is used. In JP 4804588B (Patent Document 3), there is described a structure in which a retardation film is bonded to a viewing-side surface of an IPS liquid crystal display panel through a pressure-sensitive adhesive layer, and a polarizer having a thickness of 10 μm or less is bonded to the retardation film.

In JP 4757347B (Patent Document 4), there is described an optical film serving as a retardation film and having a thickness of 20 μm or less.

The IPS liquid crystal display panel used with optical films such as a polarizer and a retardation film is not only employed in a relatively large-sized screen for liquid crystal televisions, liquid crystal displays and the like, but also recently applied to a screen for mobile small-sized electronic devices, such as a smartphone and a tablet PC. Recent years, along with a reduction in thickness of such mobile electronic devices, an IPS liquid crystal display panel has been produced to become thinner.

CITATION LIST

Patent Document

Patent Document 1: JP 3687854B
Patent Document 2: JP 4938632B
Patent Document 3: JP 4804588B
Patent Document 4: JP 4757347B
Patent Document 5: JP 4751481B
Patent Document 6: JP 4751486B
Patent Document 7: JP 5244848B
Patent Document 8: JP 4853920B

SUMMARY OF INVENTION

Technical Problem

As a result of a reduction in thickness of an IPS liquid crystal display panel, curl has started to occur in a structure where an optical film such as a polarizer or a retardation film is laminated to the IPS liquid crystal display panel. This curl exerts a negative influence on a function of the optical film such as a polarizer or a retardation film, so that there is a problem of failing to effectively fulfill an original function of the polarizer or retardation film to improve a deterioration in contrast occurring when viewing the IPS liquid crystal display panel from an oblique direction (e.g., at an angle of 45 degrees) with respect to an absorption axis of the polarizer, or a phenomenon (color shift) that display color varies when viewed from different angles.

It is therefore an object of the present invention to thin a polarizer which is easily expandable and contractable, and thin a retardation film located between the polarizer and an IPS liquid crystal display panel to enable the polarizer to come closer to the IPS liquid crystal display panel than ever before to thereby prevent curl of the IPS liquid crystal display panel. In addition to achieving the above object, the present invention also proposes a continuous optical film laminate exhibiting desired performance such as a wide viewing angle and a high polarization degree, and good optical durability under humidification, even after thinning the polarizer and the retardation film, a continuous optical film laminate roll obtained by winding the continuous optical film laminate in the form of a roll, and an IPS liquid crystal display device.

Solution to Technical Problem

According to a first aspect of the present invention, there is provided a continuous optical film laminate for an IPS liquid crystal display device. The continuous optical film laminate comprises: a polyvinyl alcohol (PVA)-iodine based polarizer in the form of a continuous web, comprising a polyvinyl alcohol-based resin layer stretched in a longitudinal direction thereof to have a thickness of 12 µm or less, and iodine adsorbed on a PVA molecular chain oriented in the stretching direction of the polyvinyl alcohol-based resin layer in the form of a PVA-polyiodine ion complex; a retardation film in the form of a continuous web, laminated to one surface of the polarizer through only a first adhesive layer; a first pressure-sensitive adhesive layer disposed on a surface of the retardation film on a side opposite to the polarizer; a release film in the form of a continuous web, laminated to a surface of the first pressure-sensitive adhesive layer on a side opposite to the retardation film; and a protective layer laminated to the other surface of the polarizer on a side opposite to the retardation film through a second adhesive layer; wherein: the polarizer contains iodine in a concentration of 3 weight % or more with respect to the polyvinyl alcohol-based resin, and has a PVA molecular orientation property of 0.38 or more and a polarization degree of 99.8% or more; the retardation film is formed as a single-layer film having a thickness d of 20 µm or less and exhibiting a refractive index distribution in which refractive indexes nx, ny, nz in respective directions of an x-axis, a y-axis and a z-axis satisfy the following relationships: nx>nz>ny, where: the x-axis is an in-plane direction of the retardation film along which a refractive index is maximized; the y-axis is an in-plane direction of the retardation film orthogonal to the x-axis; and the z-axis is a thickness direction of the retardation film, wherein the retardation film exhibits: an in-plane refractive index difference Δnxy of $5.5 \times 10^{-3}$ or more; Re of 100 to 300 nm (where Re is defined by the following formula: Re=(nx−ny)×d); Nz of 0.3 to 0.8 (where Nz is defined by the following formula: Nz=(nx−nz)/(nx−ny)); and a photoelastic coefficient of $5 \times 10^{-11}$ or more, and wherein the retardation film has a slow axis in a width direction perpendicular to the longitudinal direction; each of the first and second adhesive layer has a thickness of 2 µm or less and exhibits an elastic modulus ranging from $1 \times 10^5$ to $3 \times 10^9$ Pa; and the protective film has a thickness of 10 to 50 µm; wherein a moisture permeability of the protective layer is set to 1500 g/m² or less when the polarizer has a thickness of greater than 10 µm, and to 200 g/m² or less when the polarizer has a thickness of 10 µm or less.

In a preferred embodiment of the continuous optical film laminate according to the first aspect of the present invention, a distance between the surface of the polarizer on the side of the second adhesive layer and a surface of the release film on the side of the first pressure-sensitive adhesive layer is 50 µm or less.

In a preferred embodiment of the continuous optical film laminate according to the first aspect of the present invention, the continuous optical film laminate is wound in the form of a roll.

According to a second aspect of the present invention, there is provided an IPS liquid crystal display device. The IPS liquid crystal display device comprises: an IPS liquid crystal display panel; a viewing-side optical film laminate comprising at least a viewing-side polarizer and a retardation film and disposed on a viewing side of the IPS liquid crystal display panel; and a backlight-side optical film laminate comprising at least a backlight-side polarizer and a brightness enhancement film and disposed on a backlight side of the IPS liquid crystal display panel; wherein: the viewing-side optical film laminate is constructed such that: the viewing-side polarizer includes a polyvinyl alcohol (PVA)-iodine based polarizer in the form of a continuous web, comprising a polyvinyl alcohol (PVA)-based resin layer uniaxially stretched to have a thickness of 12 µm or less, and iodine adsorbed on a PVA molecular chain oriented in the stretching direction of the polyvinyl alcohol-based resin layer in the form of a PVA-polyiodine ion complex, wherein the viewing-side polarizer contains iodine in a concentration of 3 weight % or more, and has a PVA molecular orientation property of 0.38 or more and a polarization degree of 99.8% or more; and the retardation film is formed as a single-layer film having a thickness d of 20 µm or less and exhibiting a refractive index distribution in which refractive indexes nx, ny, nz in respective directions of an x-axis, a y-axis and a z-axis satisfy the following relationships: nx>nz>ny, where: the x-axis is an in-plane direction of the retardation film along which a refractive index is maximized; the y-axis is an in-plane direction of the retardation film orthogonal to the x-axis; and the z-axis is a thickness direction of the retardation film, wherein the retardation film exhibits: an in-plane refractive index difference Δnxy of $5.5 \times 10^{-3}$ or more; Re of 100 to 300 nm (where Re is defined by the following formula: Re=(nx−ny)×d); Nz of 0.3 to 0.8 (where Nz is defined by the following formula: Nz=(nx−nz)/(nx−ny)); and a photoelastic coefficient of $5 \times 10^{-11}$ or more, and wherein the retardation film is bonded to the viewing-side polarizer through only an adhesive layer having a thickness of 2 µm or less and exhibiting an elastic modulus of $1 \times 10^5$ to $3 \times 10^9$ Pa, in such a manner that a slow axis thereof becomes substantially orthogonal to an absorption axis of the viewing-side polarizer, and further bonded to a viewing-side surface of the IPS liquid crystal display panel through a pressure-sensitive adhesive layer; wherein, in the viewing-side surface of the IPS liquid crystal display panel, a distance from the viewing-side surface of the IPS liquid crystal display panel to a surface of the viewing-side polarizer on the side of the second adhesive layer is 50 µm or less; and the backlight-side optical film laminate is constructed such that: the backlight-side polarizer comprises a polyvinyl alcohol-based resin layer uniaxially stretched to have a thickness of 12 µm or less, and iodine adsorbed on a PVA molecular chain oriented in the stretching direction of the polyvinyl alcohol-based resin layer in the form of a PVA-polyiodine ion complex, wherein the backlight-side polarizer contains iodine in a concentration of 3 weight % or more, and has a PVA molecular orientation property of 0.38 or more and a polarization degree of 99.8% or more, and wherein the backlight-side polarizer has one surface bonded to a protective layer through a third adhesive layer having a thickness of 2 µm or less and exhibiting an elastic modulus ranging from $1 \times 10^5$ to $3 \times 10^9$ Pa, and wherein the protective layer is bonded to a backlight-side surface of the IPS liquid crystal display panel through a second pressure-sensitive adhesive layer; wherein, on the backlight side of the IPS liquid crystal display panel, a distance from the backlight-side surface of the IPS liquid crystal display panel to a backlight-side surface of the backlight-side polarizer is 50 µm or less; and wherein a difference between the distance from the viewing-side surface of the IPS liquid crystal display panel and the protective layer-side surface of the viewing-side polarizer and the distance from the backlight-side surface of the IPS liquid crystal display panel to the backlight-side surface of the backlight-side polarizer is 10 µm or less.

In a preferred embodiment of the continuous optical film laminate according to the second aspect of the present invention, the viewing-side optical film laminate comprises a protective film bonded to the surface of the viewing-side polarizer on the side opposite to the retardation film, through an additional adhesive layer. The protective layer in the backlight-side optical film laminate may be provided with respect to each or one of the opposite surfaces of the backlight-side polarizer.

In a preferred embodiment of the continuous optical film laminate according to the second aspect of the present invention, the additional adhesive layer has a thickness of 2 μm or less and exhibits an elastic modulus of $1\times10^5$ to $3\times10^9$ Pa.

According to a third aspect of the present invention, there is provided an IPS liquid crystal display device having the same structure as that in the above IPS liquid crystal display device according to the second aspect of the present invention, except that the viewing-side optical film laminate is provided on the backlight side, and the backlight-side optical film laminate is provided on the viewing side.

Effect of Invention

The present invention provides a continuous optical film laminate for an IPS liquid crystal display device, in which a polarizer is reduced in thickness, and a retardation film located between the polarizer and an IPS liquid crystal display panel is also reduced in thickness, so that it becomes possible to dispose the polarizer at a position closer to the IPS liquid crystal display panel to thereby prevent curl of the IPS liquid crystal display panel having an optical film laminate attached thereto.

Further, in the continuous optical film laminate, the continuous optical film laminate roll obtained by winding the continuous optical film laminate in the form of a roll or the IPS liquid crystal display device according to the present invention, in addition to a reduction in thickness of the polarizer and the retardation film, various parameters, such as the PVA molecular orientation property and the polarization degree of the polarizer, the refractive index and the photoelastic coefficient of the retardation film and the moisture permeability of the protective film, are set to suitable values for an IPS liquid crystal display device, based on a result of comparison between a plurality of examples, so that it becomes possible to achieve desired performance such as a wide viewing angle and a high polarization degree, and good optical durability under humidification, even after thinning the polarizer and the retardation film.

DESCRIPTION OF EMBODIMENTS

Figure 1:
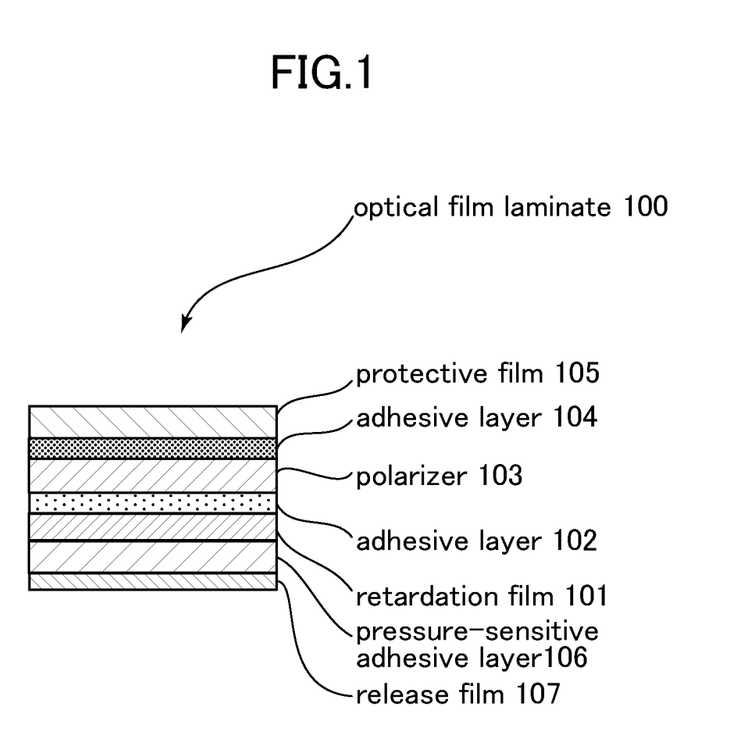
FIG. 1 is a sectional view depicting a structure of a continuous optical film laminate for an IPS liquid crystal display device, according to one embodiment of the present invention.

FIG. 1 depicts a structure of a continuous optical film laminate for an IPS liquid crystal display device, according to one embodiment of the present invention. The optical film laminate 100 comprises: a retardation film 101; a sub-laminate of an adhesive layer 102, a polarizer 103, an adhesive layer 104 and a protective film 105, which are laminated to one surface (in FIG. 1, an upper surface) of the retardation film 101 in this order; and a sub-laminate of a pressure-sensitive adhesive layer 106 and a release film 107, which are laminated to the other surface (in FIG. 1, a lower surface) of the retardation film 101 in this order. The retardation 101 and the polarizer 103 are laminated together through only the adhesive layer 102. When laminating the optical film laminate 100 to a target object such as an IPS liquid crystal display panel, through the pressure-sensitive adhesive layer 106, the release film 107 is peeled off from the pressure-sensitive adhesive layer 106.

(Retardation Film)

The retardation film can be produced based on a production method described, for example, in JP 4757347B (Patent Document 4). This retardation film production method comprises a coating film forming step of applying a birefringent layer-forming material comprising a non-liquid crystalline material having a thickness-directional birefringent index (Δnxz: expressed as Δnxz=nx'−nz') of 0.0007 or more, directly onto a shrinkable film to thereby form a coating film on the shrinkable film; and a birefringent layer forming step of causing the coating film to shrink according to shrinkage of the shrinkable film, so as to enable the coating film to have a refractive index distribution satisfying the following relationship: nx>nz>ny, to thereby form a birefringent layer. The above variables are defined as follows.

nx': a refractive index of a solidified layer formed by solidifying the non-liquid crystalline material, in an in-plane direction (slow axis direction) of the solidified layer along which the refractive index is maximized nz': a refractive index of the solidified layer in a thickness direction thereof orthogonal to both of the direction corresponding to the nx' and a direction (fast axis direction) orthogonal to the direction corresponding to the nx' nx: a refractive index of the birefringent layer in an in-plane direction (slow axis direction) thereof along which the refractive index is maximized ny: a refractive index of the birefringent layer in an in-plane direction (fast axis direction) thereof orthogonal to the direction corresponding to the nx nz: a refractive index of the birefringent layer in a thickness direction thereof orthogonal to both of the directions corresponding to the nx and the ny Assuming that, according to the above definitions, an in-plane direction of the retardation film along which a refractive index is maximized is an x-axis, and an in-plane direction of the retardation film orthogonal to the x-axis and a thickness direction of the retardation film are, respectively, a y-axis and a z-axis, and considering a result of the aftermentioned EXAMPLE (see Table 1), the retardation film 101 is formed, for example, as a single-layer film having a thickness d of 20 μm or less and exhibiting a refractive index distribution in which refractive indexes nx, ny, nz in respective directions of the x-axis, the y-axis and the z-axis satisfy the following relationships: nx>nz>ny, wherein the retardation film exhibits: an in-plane refractive index difference Δnxy of $5.5\times10^{-3}$ or more; Re of 100 to 300 nm, preferably, 130 to 300 nm, particularly preferable, 250 to 290 (where Re is defined by the following formula:

Re=(nx−ny)×d); Nz of 0.3 to 0.8, preferably, 0.35 to 0.75, particularly preferable, 0.4 to 0.6 (where Nz is defined by the following formula: Nz=(nx−nz)/(nx−ny)); and a photoelastic coefficient of $5 \times 10^{-11}$ or more, preferably, $1 \times 10^{-10}$ or more, and wherein the retardation film has a slow axis in a width direction perpendicular to a longitudinal direction thereof.

(Polarizer)

Generally, a polarizer is produced by impregnating a polyvinyl alcohol (PVA)-based resin film with a dichroic material to adsorb the dichroic material to the PVA-based resin film, through a dyeing step, and uniaxially or biaxially stretching the PVA-based resin film to orient the adsorbed dichroic material. In recent years, iodine has been commonly used as the dichroic material. In the dyeing step, the PVA-based resin film is immersed in an aqueous iodine solution. In this situation, iodine molecules ($I_2$) are not soluble in water by themselves. Thus, iodine is dissolved in water together with potassium iodide (KI) to prepare an aqueous iodine-potassium iodide solution. In the aqueous iodine-potassium iodide solution, there are polyiodide ions ($I_3^-$ and $I_5^-$) formed by coupling between iodine ions and an iodine molecule, in addition to potassium ions ($K^+$) and iodine ions ($I^-$). In the dyeing step, iodine ions and polyiodide ions penetrate into the PVA-based resin film, and are adsorbed onto molecules of the PVA-based resin. Then, when the PVA-based resin film is stretched and molecularly oriented in a subsequent stretching step, the polyiodide ions are also oriented in a stretching direction. A transmittance of light entering into the dyed and stretched PVA-based resin varies depending on an angle of a polarization direction of the entering light with respect to an orientation direction of the oriented polyiodide ions, so that the dyed and stretched PVA-based resin functions as a polarizer.

Thus, the resulting polarizer comprises at least a PVA-based resin and polyiodide ions. In the polarizer, the polyiodide ions are present in a state in which they form PVA-iodine complexes ($PVA \cdot I_3^-$ and $PVA \cdot I_5^-$) by an interaction with PVA-based resin molecules. By forming such a complexed state, an absorption dichroism is exhibited in a wavelength range of visible light. An iodine ion ($I^-$) has an absorption peak around 230 nm. A triiodide ion in a complexed state with PVA ($PVA \cdot I_3^-$) has an absorption peak around 470 nm. A pentaiodide ion in a complexed state with PVA ($PVA \cdot I_5^-$) has an absorption peak around 600 nm. A wavelength of light to be absorbed varies depending on a type of PVA-iodine complex, so that the polyiodide ion has a broad absorption peak. PVA-iodine complexes absorb visible light. On the other hand, an iodine ion has a peak around 230 nm, i.e., does not absorb visible light. Thus, an amount of polyiodide ions complexed with PVA exerts an influence on performance of a polarizer in a display device such as a liquid crystal display device. For example, considering the result of the aftermentioned EXAMPLE (see Table 1), the polarizer 103 in the embodiment depicted in FIG. 1 may be constructed to contain iodine in a concentration of 3 weight % or more with respect to the polyvinyl alcohol-based resin, and have a PVA molecular orientation property of 0.38 or more and a polarization degree of 99.8% or more.

In the embodiment depicted in FIG. 1, the thickness of the polarizer 103 is 12 µm or less, preferably, 5 µm or less. For example, a 12 µm-thick polarizer can be produced using a 30 µm-thick polyvinyl alcohol-based raw film according to the aforementioned production method. By thinning the polarizer in this manner, it becomes possible to reduce expansion and contraction forces which can be generated in the polarizer along with surrounding environmental changes. In the case where the polarizer has a relatively large thickness, relatively large expansion and contraction forces will be generated in the polarizer, so that it becomes necessary to laminate a protective film or a retardation film having a thickness enough to suppress expansion and contraction of the polarizer. In contrast, by thinning the polarizer to reduce expansion and contraction forces which can be generated in the polarizer, it becomes possible to reduce a thickness of the protective film or the retardation film to be laminated to the polarizer, and reduce an overall thickness of a resulting optical laminate. In addition, as a result of reducing the thickness of the polarizer to reduce expansion and contraction forces which can be generated in the polarizer along with surrounding environmental changes, it becomes possible to obtain an advantageous effect of being able to reduce a stress which can be generated between the polarizer and a member laminated thereto to thereby suppress an optical distortion which can be generated in the laminated member.

Preferably, the polarizer 130 exhibits an absorption dichroism at any wavelength in a wavelength range of 380 nm to 780 nm. The polarizer has a single transmittance of, preferably, 40.0% or more, more preferably, 40.5% or more, further preferably, 41.0% or more, particularly preferably, 41.5% or more. The polarizer has a polarization degree of, preferably, 99.8% or more, more preferably, 99.9% or more, further preferably, 99.95% or more. It is not easy to produce such a thinned polarizer exhibiting high polarization performance. However, a thinned polarizer with desired properties can be produced by employing a method described in any one of the Patent Documents 5 to 7 proposed by the applicant of this application.

(Protective Film)

As the protective film, any suitable resin film may be employed. Examples of a material suitably usable in the present invention to form the protective film include: a cycloolefin-based resin such as a norbornene-based resin; an olefin-based resin such as polyethylene or polypropylene; a polyester-based resin; a (meth) acrylic-based resin; and a cellulosic ester-based resin. As used here, the term "(meth) acrylic-based resin" means at least one of an acrylic-based resin and a methacrylic-based resin.

In the embodiment depicted in FIG. 1, the protective film 105 has a thickness of 10 µm to 50 µm, preferably, 15 µm to 45 µm. In the case where the protective film is disposed on a viewing side of a liquid crystal display device, an anti-glare or anti-reflection layer, or a surface-treated layer such as a hard coat layer for protecting from scratch, may be appropriately provided. In an in-cell type capacitance touch panel, for preventing low-frequency noise around a display from hindering a display operation, it is necessary, but not particularly limited to, to provide a transparent electrically-conductive film having electromagnetic shielding and anti-static functions to the protective film. Further, in the case where the protective film itself is formed as a 214 plate, it serves as a measure against deterioration in viewability of a polarized sunglass.

When the thickness of the polarizer is 10 µm or less, the protective film 105 has a moisture permeability of, preferably, 200 g/m² or less, preferably, 170 g/m² or less, more preferably, 130 g/m² or less, particularly preferably, 90 g/m² or less. Generally, a polarizer has a problem that a reduction in thickness thereof causes deterioration in humidity resistance. By reducing the moisture permeability of the protective film in the above manner, it becomes possible to suppress degradation of the polarizer due to humidity to thereby enable the polarizer to be reduced in thickness.

When the thickness of the polarizer is greater than 10 μm, the degradation of the polarizer due to humidity can be suppressed as long as the moisture permeability of the protective film is 1500 g/m² or less. By enabling the polarizer to be thinned, the thickness of the protective film or the retardation film to be laminated to this polarizer can also be reduced, as mentioned above, so that it becomes possible to reduce an overall thickness of a resulting optical laminate.

Figure 2:
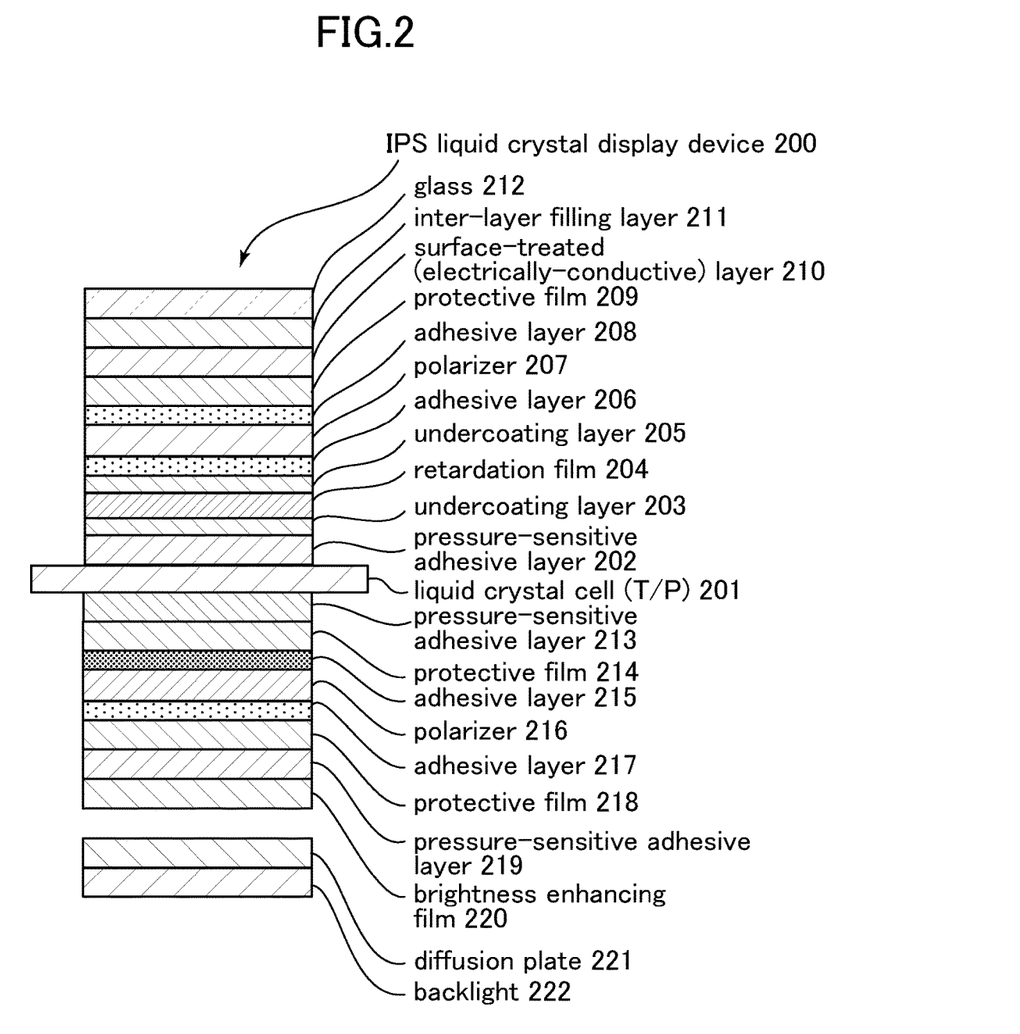
FIG. 2 is a sectional view depicting a structure of an IPS liquid crystal display device having an optical film laminate according to one embodiment of the present invention, on a viewing side thereof.

FIG. 2 depicts a structure of an IPS liquid crystal display device having an optical film laminate according to one embodiment of the present invention, on a viewing side thereof. The IPS liquid crystal display device 200 comprises: an in-cell touch panel type liquid crystal cell (T/P) 201; and a sub-laminate of a pressure-sensitive adhesive layer 202, an undercoating layer 203, a retardation film 204, an undercoating layer 205, an adhesive layer 206, a polarizer 207, an adhesive layer 208, a protective film 209, a surface-treated (electrically-conductive) layer 210, an inter-layer filling layer 211 and a glass 212, which are laminated to one surface (in FIG. 2, an upper surface) of the liquid crystal cell (T/P) 201 in this order; and a sub-laminate of a pressure-sensitive adhesive layer 213, a protective film 214, an adhesive layer 215, a polarizer 216, an adhesive layer 217, a protective film 218, a pressure-sensitive adhesive layer 219 and a brightness-enhancement film 220, which are laminated to the other surface (in FIG. 2, a lower surface) of the liquid crystal cell (T/P) 201 in this order. The IPS liquid crystal display device 200 further comprises a diffusion plate 221 and a backlight 222 bonded to the diffusion plate 221, which are disposed with a distance from the brightness enhancement film 220. The backlight 222 is bonded to a surface of the diffusion plate 221 on a side opposite to the brightness enhancement film 220.

The pressure-sensitive adhesive layer 202, the retardation film 204, the adhesive layer 206, the polarizer 207, the adhesive layer 208 and the protective film 209 are equivalent, respectively, to the pressure-sensitive adhesive layer 106, the retardation film 101, the adhesive layer 102, the polarizer 103, the adhesive layer 104 and the protective film 105 in the optical film laminate 100 depicted in FIG. 1. When bonding between the retardation film 204 and each of the pressure-sensitive adhesive layer 202 and the adhesive layer 206 is sufficiently strong, the undercoating layers 203, 205 may be omitted.

The liquid crystal cell (T/P) 201 which is an IPS-type liquid crystal cell is configured to, in an electric field non-applied state, achieve a homogeneous orientation in which liquid crystal molecules are homogeneously oriented in one in-plane direction of the liquid crystal cell. In a liquid crystal display device having the IPS-type liquid crystal cell configured as above, a pair of polarizers is disposed on, respectively, on opposite sides of the liquid crystal cell, while their absorption axes are oriented orthogonal to each other.

Further, one of the polarizers is disposed with respect to the liquid crystal cell such that the absorption axis of the one polarizer to become parallel to the orientation direction of the liquid crystal molecules in the electric field non-applied state. Typically, this electric field non-applied state corresponds to a "black display" state. On the other hand, a "white display state" is realized by applying an electric field to the liquid crystal cell to rotate the liquid crystal molecules horizontally in the plane of the liquid crystal cell to thereby develop phase retardation so as to enable light passing through the one polarizer to be transmitted through the other polarizer. The "white display state" is realized when each of the liquid crystal molecules is oriented at an orientation angle coincident with an intermediate angle of an intersecting angle between the absorption axes of the pair of polarizers, i.e., at an orientation angle of 45°, to provide a maximum light transmittance. Actually, it is difficult to rotate the liquid crystal molecules to reach the ideal orientation angle of 45°, and therefore a state at an orientation angle substantially equal to, i.e., close to, 45°, is defined as the "white display state". When the IPS liquid crystal display device is configured to dispose a backlight source-side one of the polarizers such that the absorption axis thereof becomes parallel to the orientation direction of the liquid crystal molecules in the electric field non-applied state, such a configuration is referred to as "O-mode". On the other hand, when the liquid crystal display device is configured to dispose a viewing-side one of the polarizers such that the absorption axis thereof becomes parallel to the orientation direction of the liquid crystal molecules in the electric field non-applied state, such a configuration is referred to as "E-mode".

(Brightness Enhancement Film)

The brightness enhancement film exhibits a property that, when light from a backlight of a liquid crystal display or the like or natural light reflected from a back surface of the liquid crystal display or the like enters, it reflects a linearly-polarized light component with a given polarization axis or a circularly-polarized light component rotating in a given direction and transmits the remaining light components. A polarizing plate having the brightness enhancement film laminated thereto is capable of receiving light from a light source such as a backlight to obtain a transmitted light component in a given polarization state, and preventing transmission of, i.e., reflecting, light components other than that in the given polarization state. The light components reflected by a surface of the brightness enhancement film are further reversed by a reflective layer or the like provided behind the brightness enhancement film, and re-entered into the brightness enhancement film to enable a part or entirety of the re-entered light components to be transmitted therethrough as the light component in the given polarization state, to increase an amount of light transmittable through the brightness enhancement film, and supply, to the polarizer, a polarized light component which is less likely to be absorbed by the polarizer, so that an amount of light utilizable by a liquid crystal image display or the like can be increased, thereby enhancing brightness.

Figure 3:
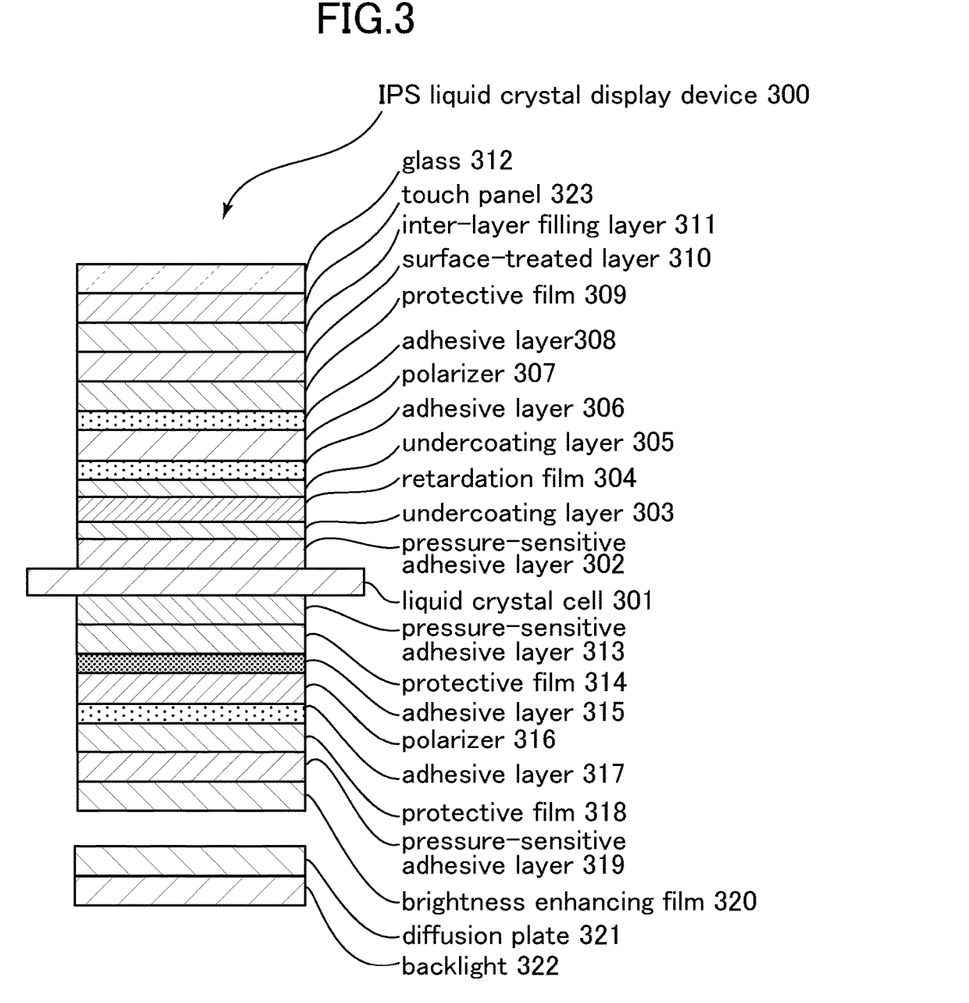
FIG. 3 is a sectional view depicting a structure of an IPS liquid crystal display device having an optical film laminate according to another embodiment of the present invention, on a viewing side thereof.

FIG. 3 depicts a structure of an IPS liquid crystal display device having an optical film laminate according to another embodiment of the present invention, on a viewing side thereof. Differently from the liquid crystal cell (T/P) 201 of the IPS liquid crystal display device 200 depicted in FIG. 2, the IPS liquid crystal display device 300 employs, as a liquid crystal display panel, a liquid crystal cell 301 which is not an in-cell touch panel type, and comprises a touch panel 323 on a surface of an inter-layer filling layer 311 on a side opposite to a surface-treated layer 310. The remaining structure of the IPS liquid crystal display device 300 is the same as that of the IPS liquid crystal display device 200 depicted in FIG. 2.

Figure 4:
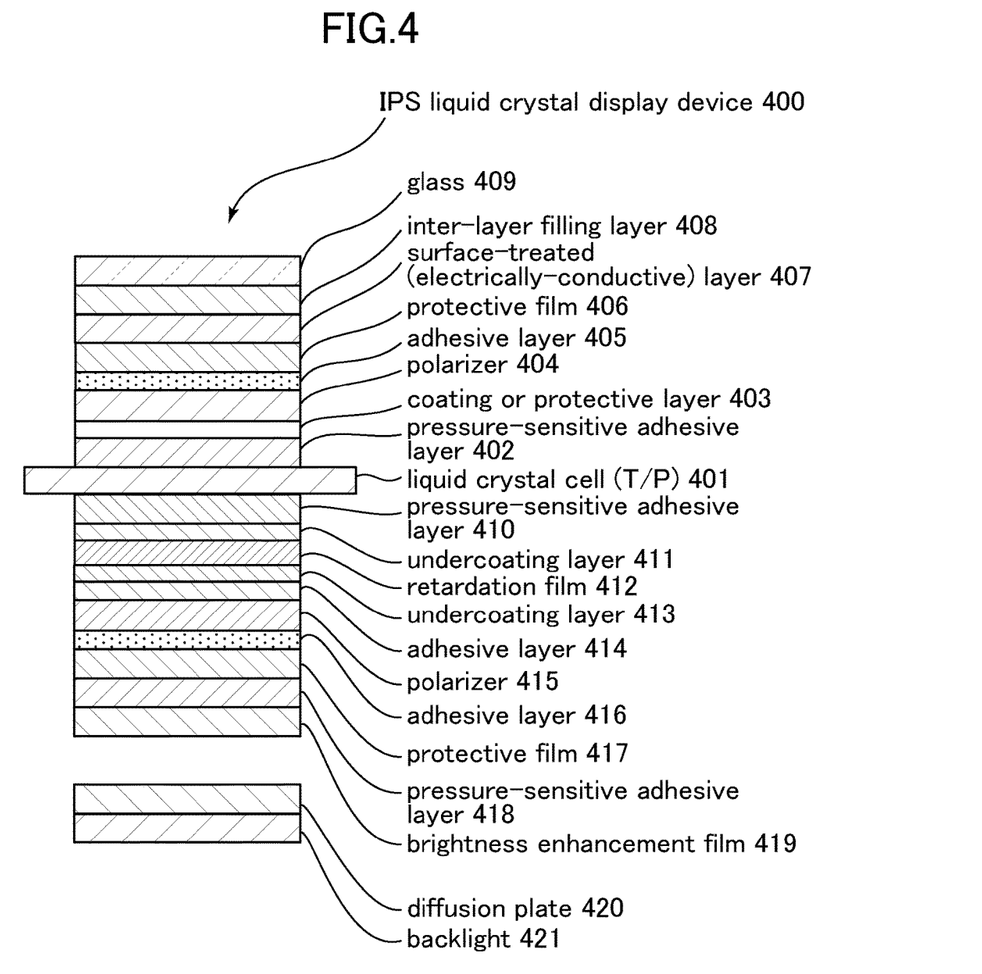
FIG. 4 is a sectional view depicting a structure of an IPS liquid crystal display device having an optical film laminate according to one embodiment of the present invention, on a backlight side thereof.

FIG. 4 depicts a structure of an IPS liquid crystal display device having an optical film laminate according to one embodiment of the present invention, on a backlight side thereof. Differently from the IPS liquid crystal display device 200 depicted in FIG. 2, the IPS liquid crystal display device 400 comprises a retardation film 412 on the backlight side.

Specifically, the IPS liquid crystal display device 400 comprises: an in-cell touch panel type liquid crystal cell (T/P) 401; and a sub-laminate of a pressure-sensitive adhesive layer 402, a coating or protective film 403, a polarizer 404, an adhesive layer 405, a protective film 206, a surface-treated (electrically-conductive) layer 407, an inter-layer filling layer 408 and a glass 409, which are laminated to one surface (in FIG. 4, an upper surface) of the liquid crystal cell (T/P) 401 in this order; and a sub-laminate of a pressure-sensitive adhesive layer 410, an undercoating layer 411, a retardation film 412, an undercoating layer 423, an adhesive layer 414, a polarizer 415, an adhesive layer 416, a protective film 417, a pressure-sensitive adhesive layer 418 and a brightness enhancement film 419, which are laminated to the other surface (in FIG. 4, a lower surface) of the liquid crystal cell (T/P) 401 in this order. When bonding between the retardation film 412 and each of the pressure-sensitive adhesive layer 410 and the adhesive layer 414 is sufficiently strong, the undercoating layers 411, 413 may be omitted. The IPS liquid crystal display device 400 further comprises a diffusion plate 420 and a backlight 421 bonded to the diffusion plate 420, which are disposed with a distance from the brightness enhancement film 419. The backlight 421 is bonded to a surface of the diffusion plate 420 on a side opposite to the brightness enhancement film 419.

Generally, a thinned, pressure-sensitive adhesive-attached polarizing plate provided with a transparent protective film on only one surface thereof has poor durability, so that, when the polarizer is placed in a severe environment, crack is likely to occur in a stretching direction thereof. Thus, in order to improve crack resistance, the coating or protective film 403 may be bonded to the polarizer 404. The remaining structure of the IPS liquid crystal display device 400 is the same as that of the IPS liquid crystal display device 200 depicted in FIG. 2.

Figure 5:
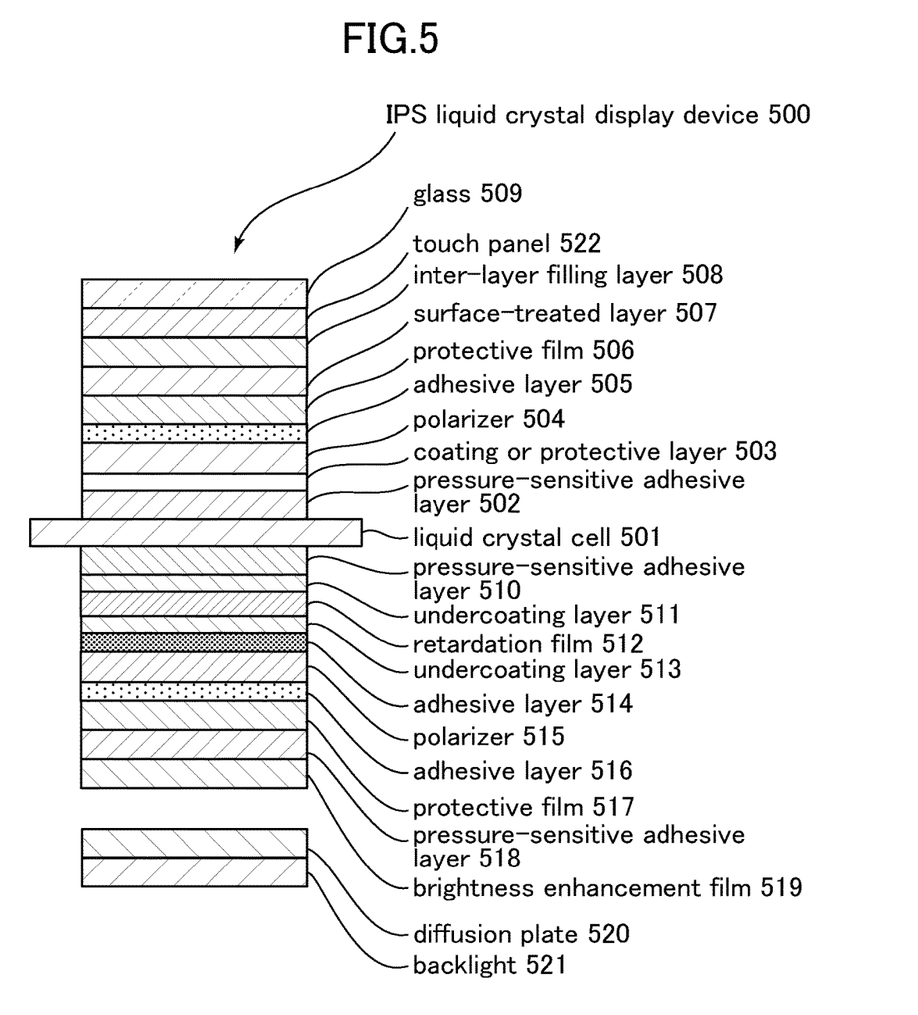
FIG. 5 is a sectional view depicting a structure of an IPS liquid crystal display device having an optical film laminate according to another embodiment of the present invention, on a backlight side thereof.

FIG. 5 depicts a structure of an IPS liquid crystal display device having an optical film laminate according to another embodiment of the present invention, on a backlight side thereof. Differently from the liquid crystal cell (T/P) 401 of the IPS liquid crystal display device 400 depicted in FIG. 4, the IPS liquid crystal display device 500 employs, as a liquid crystal display panel, a liquid crystal cell 501 which is not an in-cell touch panel type, and comprises a touch panel 522 on a surface of an inter-layer filling layer 508 on a side opposite to a surface-treated layer 507. The remaining structure of the IPS liquid crystal display device 500 is the same as that of the IPS liquid crystal display device 400 depicted in FIG. 4.

EXAMPLES

The following description will be made about Inventive Examples 1 to 7. As comparative references, Comparative Examples 1 to 3 will also be described. Further, the Inventive Examples and Comparative Examples will be collectively presented as Table 1. Each item on the uppermost row in Table 1 represents an element laminated to an upper or lower surface of a liquid crystal cell. For example, "protective film", "second adhesive layer", "viewing-side polarizer", "first adhesive layer", "retardation film", "first pressure-sensitive adhesive layer", "second pressure-sensitive adhesive layer", "protective film", "third adhesive layer" and "backlight-side polarizer", which are presented on the uppermost row in Table 1 are equivalent, respectively, to "protective film 209", "adhesive layer 208", "polarizer 207", "adhesive layer 206", "retardation film 204", "pressure-sensitive adhesive layer 202", "pressure-sensitive adhesive layer 213", "protective film 214", "adhesive layer 215" and "polarizer 216" in the embodiment depicted in FIG. 2.

(Example of Production of Retardation Film)

In a reaction vessel equipped with a stirring device, 2.70 kg of 2,2-bis(4-hydroxyphenyl)-4-methylpentane and 0.06 kg of tetrabutylammonium chloride were dissolved in 25 L of a 1 M sodium hydroxide solution. To this solution, a solution obtained by dissolving 1.22 kg of terephthalic acid chloride and 0.81 kg of isophthalic acid chloride in 30 ml of toluene was added under stirring. The resulting mixed solution was stirred at room temperature for 90 minutes. Subsequently, the polymerization solution was subjected to static separation to separate a polymer-containing toluene solution, and the polymer-containing toluene solution was washed with an acetic acid aqueous solution and ion-exchanged water and then put into methanol to cause precipitation of the polymer. The precipitated polymer was filtered and dried under reduced pressure to obtain 3.41 kg of a white polymer (yield: 92%).

The obtained polymer was dissolved in toluene, and the resulting solution was applied onto biaxially-stretched polypropylene. The applied solution was dried at 80° C. for 5 minutes and then dried at 110° C. for 5 minutes to prepare a laminate film in which the coating film has a thickness of 15 μm. The obtained laminate film was stretched 1.2 times in a cross direction while being contracted 0.75 times in a machine direction (MD), at 145° C. using a simultaneous biaxial stretching machine, while being conveyed, to obtained a retardation film 1 in the form of a roll. The obtained retardation film 1 had a thickness of 15.0 μm, wherein: Re=275 nm; Rth=138 nm; and Nz=0.5.

(Example of Production of Retardation Film 2)

The polymer obtained in the above example was dissolved in toluene, and the resulting solution was applied onto biaxially-stretched polypropylene. The applied solution was dried at 80° C. for 5 minutes and then dried at 110° C. for 5 minutes to prepare a laminate film in which the coating film has a thickness of 15 μm. The obtained laminate film was stretched 1.25 times in the cross direction while being contracted 0.80 times in the machine direction (MD), at 145° C. using a simultaneous biaxial stretching machine, while being conveyed, to obtained a retardation film 2 in the form of a roll. The obtained retardation film 2 had a thickness of 15.0 μm, wherein: Re=275 nm; Rth=206 nm; and Nz=0.75.

TABLE 1

|  | Protective layer Thickness (μm) | Second adhesive layer Thickness (μm) | Viewing-side polarizer Thickness (μm) | Bonding | First adhesive layer Thickness (μm) | Protective layer Thickness (μm) | Pressure-sensitive adhesive layer Thickness (μm) | Retardation film Retardation material |
|---|---|---|---|---|---|---|---|---|
| Inventive Example 1 | 20 | 1 | 5 | Direct bonding | 1 | — | — | Retardation film 1 |
| Inventive Example 2 | 20 | 1 | 5 | Direct bonding | 1 | — | — | Retardation film 2 |

TABLE 1-continued

| | | | | | | | | | |
|---|---|---|---|---|---|---|---|---|---|
| Inventive Example 3 | 20 | 1 | 5 | Direct bonding | 1 | — | — | Retardation film 3 |
| Inventive Example 4 | 20 | 1 | 5 | Direct bonding | 1 | — | — | Retardation film 4 |
| Inventive Example 5 | 20 | 1 | 5 | Direct bonding | 1 | — | — | Retardation film 5 |
| Inventive Example 6 | 25 | 1 | 12 | Direct bonding | 1 | — | — | Retardation film 1 |
| Inventive Example 7 | 20 | 1 | 5 | Direct bonding | 1 | 20 | — | Retardation film 1 |
| Comparative Example 1 | 20 | 1 | 5 | — | 1 | 20 | 23 | Retardation film 6 |
| Comparative Example 2 | 20 | 1 | 5 | — | 1 | 20 | 23 | Retardation film 7 |
| Comparative Example 3 | 25 | 1 | 16 | Direct bonding | 1 | — | — | Retardation film 1 |

| | Retardation film | | | | | | First pressure-sensitive adhesive layer Thickness (μm) | Second pressure-sensitive adhesive layer Thickness (μm) | Protective layer Thickness (μm) |
|---|---|---|---|---|---|---|---|---|---|
| | Thickness (μm) | Re (nm) | Rth (nm) | Nz | Δnxy | Slow axis | photoelastic coefficient (m2/N) | | |
| Inventive Example 1 | 15 | 275 | 138 | 0.50 | 0.018 | TD | $150 \times 10^{-12}$ | 20 | 20 | 20 |
| Inventive Example 2 | 15 | 275 | 206 | 0.75 | 0.018 | TD | $150 \times 10^{-12}$ | 20 | 20 | 20 |
| Inventive Example 3 | 15 | 275 | 96 | 0.35 | 0.018 | TD | $150 \times 10^{-12}$ | 20 | 20 | 20 |
| Inventive Example 4 | 20 | 275 | 138 | 0.50 | 0.014 | TD | $150 \times 10^{-12}$ | 20 | 20 | 20 |
| Inventive Example 5 | 10 | 275 | 138 | 0.50 | 0.028 | TD | $150 \times 10^{-12}$ | 20 | 20 | 20 |
| Inventive Example 6 | 15 | 275 | 138 | 0.50 | 0.018 | TD | $150 \times 10^{-12}$ | 20 | 20 | 20 |
| Inventive Example 7 | 15 | 275 | 138 | 0.50 | 0.018 | TD | $150 \times 10^{-12}$ | 20 | 20 | — |
| Comparative Example 1 | 100 | 270 | 135 | 0.50 | 0.003 | MD | $3 \times 10^{-12}$ | 20 | 20 | 20 |
| Comparative Example 2 | 55 | 270 | 135 | 0.50 | 0.005 | MD | $50 \times 10^{-12}$ | 20 | 20 | 20 |
| Comparative Example 3 | 15 | 275 | 275 | 1.00 | 0.018 | TD | $150 \times 10^{-12}$ | 20 | 20 | 20 |

| | Third adhesive layer Thickness (μm) | Backlight-side polarizer Thickness (μm) | Viewing-side polarizer-cell distance L1 (μm) | Backlight-side polarizer-cell distance L2 (μm) | Difference in distance \|L1 − L2\| (μm) | Curling | Unevenness of heating |
|---|---|---|---|---|---|---|---|
| Inventive Example 1 | 1 | 5 | 41 | 46 | 5 | ○ | ○ |
| Inventive Example 2 | 1 | 5 | 41 | 46 | 5 | ○ | ○ |
| Inventive Example 3 | 1 | 5 | 41 | 46 | 5 | ○ | ○ |
| Inventive Example 4 | 1 | 5 | 46 | 46 | 0 | ○ | ○ |
| Inventive Example 5 | 1 | 5 | 36 | 46 | 10 | ○ | ○ |
| Inventive Example 6 | 1 | 5 | 48 | 46 | 2 | ○ | ○ |
| Inventive Example 7 | 1 | 5 | 46 | 41 | 5 | ○ | ○ |
| Comparative Example 1 | 1 | 5 | 169 | 46 | 123 | x | ○ |
| Comparative Example 2 | 1 | 5 | 124 | 46 | 78 | x | ○ |
| Comparative Example 3 | 1 | 5 | 52 | 46 | 6 | ○ | x |

(Example of Production of Retardation Film 3)

The polymer obtained in the above example was dissolved in toluene, and the resulting solution was applied onto biaxially-stretched polypropylene. The applied solution was dried at 80° C. for 5 minutes and then dried at 110° C. for 5 minutes to prepare a laminate film in which the coating film has a thickness of 15 μm. The obtained laminate film was stretched 1.15 times in the cross direction while being contracted 0.7 times in the machine direction (MD), at 145° C. using a simultaneous biaxial stretching machine, while being conveyed, to obtained a retardation film 3 in the form of a roll. The obtained birefringent retardation film had a thickness of 15.0 μm, wherein: Re=275 nm; Rth=96 nm; and Nz=0.35.

(Example of Production of Retardation Film 4)

The polymer obtained in the above example was dissolved in toluene, and the resulting solution was applied onto biaxially-stretched polypropylene. The applied solution was dried at 80° C. for 5 minutes and then dried at 110° C. for 5 minutes to prepare a laminate film in which the coating film has a thickness of 20 μm. The obtained laminate film was stretched 1.18 times in the cross direction while being contracted 0.78 times in the machine direction (MD), at 145° C. using a simultaneous biaxial stretching machine, while being conveyed, to obtained a retardation film 4 in the form of a roll. The obtained retardation film 4 had a thickness of 20.0 μm, wherein: Re=275 nm; Rth=138 nm; and Nz=0.50.

(Example of Production of Retardation Film 5)

The polymer obtained in the above example was dissolved in toluene, and the resulting solution was applied onto biaxially-stretched polypropylene. The applied solution was dried at 80° C. for 5 minutes and then dried at 110° C. for 5 minutes to prepare a laminate film in which the coating film has a thickness of 10 μm. The obtained laminate film was stretched 1.22 times in the cross direction while being contracted 0.73 times in the machine (MD) direction (MD), at 145° C. using a simultaneous biaxial stretching machine, while being conveyed, to obtained a retardation film 5 in the form of a roll. The obtained retardation film 5 had a thickness of 10.0 μm, wherein: Re=275 nm; Rth=138 nm; and Nz=0.50.

(Example of Production of Polarizer)

An A-PET (amorphous-polyethylene terephthalate) film (trade name: NOVACLEAR SH046; produced by Mitsubishi Plastics Inc.; thickness: 200 μm) was preliminarily prepared as a substrate, and a surface thereof was subjected to corona treatment (58 W/m²/min). On the other hand, PVA (polymerization degree: 4,200, saponification degree: 99.2%) added with 1 wt % of acetoacetyl-modified PVA (trade name: GOHSEFIMER Z-200; produced by Nippon Synthetic Chemical Industry Co., Ltd. (polymerization degree: 1,200, saponification degree: 99.0% or more, acetoacetyl modification degree: 4.6%)) was preliminarily prepared. Then, the PVA was applied to the substrate to enable a film thickness after drying to become 12 μm, and subjected to hot-air drying in an atmosphere at 60° C. for 10 minutes to prepare a laminate comprising the substrate and a PVA-based resin layer provided on the substrate.

Subsequently, this laminate was stretched 2.0 times in the MD, in air at 130° C., to form a stretched laminate. Then, a step of insolubilizing the PVA layer comprised in the stretched laminate and having oriented PVA molecules was performed by immersing the stretched laminate in an insolubilizing aqueous boric acid solution at a solution temperature of 30° C. for 30 seconds. The insolubilizing aqueous boric acid solution used in the insolubilizing step was prepared to contain boric acid in an amount of 3 weight parts with respect to 100 weight parts of water. The stretched laminate after the solubilization was subjected to dyeing to form a dyed laminate. Specifically, this dyed laminate was obtained by immersing the stretched laminate in a dyeing solution to adsorb iodine to the PVA layer comprised in the stretched laminate. The dyeing solution was prepared to contain iodine and potassium iodide. A solution temperature of the dyeing solution was set at 30° C., and an iodine concentration and a potassium iodide concentration were set, respectively, in the range of 0.08 to 0.25 weight % and in the range of 0.56 to 1.75 weight %, using water as a solvent. A concentration ratio of iodine to potassium iodide was set to 1:7. As dyeing conditions, the iodine concentration and an immersion time were set such that a single transmittance of a PVA-based resin layer constituting a polarizer becomes 40.9%.

Subsequently, a step of subjecting PVA molecules of the PVA layer having iodine adsorbed thereto to a cross-linking treatment was performed by immersing the dyed laminate in a cross-linking aqueous boric acid solution at 30° C., for 60 seconds. The cross-linking aqueous boric acid solution used in this cross-linking step was prepared to contain boric acid in an amount of 3 weight parts with respect to 100 weight parts of water, and potassium iodide in an amount of 3 weight parts with respect to 100 weight parts of water. Then, the obtained dyed laminate was further stretched 2.7 times in the same direction as that in the previous in-air stretching, in an aqueous boric acid solution at a stretching temperature of 70° C., to attain an ultimate total stretching ratio of 5.4 times, thereby obtaining an optical film laminate comprising a polarizer for test sample. The aqueous boric acid solution used in this stretching step was prepared to contain boric acid in an amount of 4.0 weight parts with respect to 100 weight parts of water, and potassium iodide in an amount of 5 weight parts with respect to 100 weight parts of water. The obtained optical film laminate was taken out from the aqueous boric acid solution, and boric acid adhering onto a surface of the PVA layer was washed away by an aqueous solution containing potassium iodide in an amount of 4 weight parts with respect to 100 weight parts of water. The washed optical film laminate was dried through a drying step using a hot air at 60° C. to obtain a 5 μm-thick polarizer laminated to the PET film.

(Production of First Retardation Film-Laminated Polarizing Plate)

The retardation film 1 prepared in the above manner was laminated to the 5 μm-thick polarizer laminate to the PET film, prepared in the example of production of the polarizer, specifically, to a surface of the 5 μm-thick polarizer on a side opposite to the PET film, through a UV-curable adhesive, in a roll-to-roll manner. Subsequently, after peeling the PET film from the laminate, an acrylic-based protective film was laminated to the polarizer through a UV-curable adhesive to prepared a first retardation film-laminated polarizing plate.

(Production of Second Retardation Film-Laminated Polarizing Plate)

The retardation film 1 prepared in the above manner was laminated to the 5 μm-thick polarizer laminate to the PET film, prepared in the example of production of the polarizer, specifically, to the surface of the 5 μm-thick polarizer on the side opposite to the PET film, through a UV-curable adhesive, in a roll-to-roll manner. Subsequently, after peeling the PET film from the laminate, a brightness enhancement film was laminated to the polarizer through an acrylic-based pressure-sensitive adhesive to prepare a second retardation film-laminated polarizing plate.

(Production of First Polarizing Plate)

An acrylic-based protective film was laminated to the 5 μm-thick polarizer laminated to the PET film, prepared in the example of production of the polarizer, specifically, to the surface of the 5 μm-thick polarizer on the side opposite to the PET film, through a UV-curable adhesive, in a roll-to-roll manner. Subsequently, after peeling the PET film from the laminate, a brightness enhancement film was laminated to the polarizer through an acrylic-based adhesive to prepare a first polarizing plate.

(Production of Second Polarizing Plate)

An acrylic-based protective film was laminated to the 5 μm-thick polarizer laminated to the PET film, prepared in the example of production of the polarizer, specifically, to the surface of the 5 μm-thick polarizer on the side opposite to the PET film, through a UV-curable adhesive, in a roll-to-roll manner. Subsequently, after peeling the PET film from the laminate, an acrylic-based protective film was laminated to the polarizer through a UV-curable adhesive to prepare a second polarizing plate.

Inventive Example 1

From a smartphone equipped with an IPS type liquid crystal cell (iPhone 5 produced by Apple Inc.), a liquid crystal panel was extracted, and polarizing plates disposed above and below the liquid crystal cell were removed. Then, opposite glass surfaces of the liquid crystal cell were washed. Subsequently, the first retardation film-laminated polarizing plate prepared in the above manner was laminated to a viewing-side surface of the liquid crystal cell in such a manner that an absorption axis of the polarizer in the first retardation film-laminated polarizing plate becomes orthogonal to an initial orientation direction of the liquid crystal cell, through an acrylic-based pressure-sensitive adhesive (thickness: 20 μm). Then, the first polarizing plate prepared in the above manner was laminated to a light source-side surface of the liquid crystal cell in such a manner that an absorption axis of the polarizer in the first polarizing plate becomes parallel to the initial orientation direction of the liquid crystal cell, through an acrylic-based pressure-sensitive adhesive (thickness: 20 μm), to obtain a liquid crystal panel.
(Thermal Curl Test)

After heating the liquid crystal panel having the polarizing plate laminated thereto, at 85° C. for 24 hours, the presence or absence of curl in the liquid crystal panel was visually checked. When no curling was observed, the liquid crystal panel was evaluated as ○. On the other hand, when curl was observed, the liquid crystal panel was evaluated as x.
(Thermal Brightness Unevenness Test)

After heating the liquid crystal panel having the polarizing plate laminated thereto, at 85° C. for 48 hours, the liquid crystal panel was placed on a backlight to check the presence or absence of brightness unevenness. When no brightness unevenness was observed, the liquid crystal panel was evaluated as ○. On the other hand, when brightness unevenness was observed, the liquid crystal panel was evaluated as x.

Inventive Examples 2 to 5

Except that the retardation films 2 to 5 were used in place of the retardation film 1, liquid crystal panels each having the polarizing plate laminated thereto were prepared in the same manner as that in Inventive Example 1. Then, each of the liquid crystal panels was subjected to heating, and the presence or absence of curl and brightness unevenness was checked.

Inventive Example 6

A polyvinyl alcohol film (average polymerization degree: 2400, saponification degree: 99.9 mol %, thickness: 30 μm) was immersed and swelled in warm water at 30° C., for 60 seconds. Subsequently, the film was immersed in an aqueous solution of iodine and potassium iodide (weight ratio=0.5/8) having a concentration of 0.3%, and dyed while being stretched to 3.5 times its original length. Then, the film was further stretched in an aqueous boric-acid ester solution at 65° C. to attain a total stretching ratio of 6 times. After completion of the stretching, the resulting film was dried in an oven at 40° C., for 3 minutes to obtain a polarizer. By using a water-based adhesive, a 25 μm-thick hard coat-treated TAC film and the retardation film 1 were laminated, respectively, to one surface and the other surface of the obtained 12 μm-thick polarizer. The prepared polarizing plate was laminated to the viewing-side surface of the liquid crystal cell in the same manner as that in Inventive Example 1 to obtain a liquid crystal panel. Then, the obtained liquid crystal panel was subjected to heating, and the presence or absence of curl and brightness unevenness was checked.

Inventive Example 7

The second polarizing plate prepared in the above manner was laminated to the viewing-side surface of the liquid crystal cell in such a manner that an absorption axis of the polarizer in the second polarizing plate becomes parallel to the initial orientation direction of the liquid crystal cell, through an acrylic-based pressure-sensitive adhesive (thickness: 20 μm), in the same manner as that in Inventive Example 1. Then, the second retardation film-laminated polarizing plate prepared in the above manner was laminated to the light source-side surface of the liquid crystal cell in such a manner that an absorption axis of the polarizer in the second retardation film-laminated polarizing plate becomes parallel to the initial orientation direction of the liquid crystal cell, through an acrylic-based pressure-sensitive adhesive (thickness: 20 μm), to obtain a liquid crystal panel. Then, the obtained liquid crystal panel was subjected to heating, and the presence or absence of curl and brightness unevenness was checked.

Comparative Example 1

A biaxially-stretched polypropylene film (trade name: "TORAYFAN" produced by Toray Industries Inc. (thickness: 60 μm)) was laminated to each of opposite surfaces of a 100 μm-thick norbornene-based resin film (trade name: "ZEONOR ZF14-100" produced by Zeon Corporation), through an acrylic-based pressure-sensitive adhesive layer (thickness: 15 μm). Subsequently, by using a roll stretching machine, the resulting film was stretched 1.38 times while longitudinal ends thereof are retained, in an air circulation constant-temperature oven at 146° C., to prepare a retardation film 6. The obtained retardation film 6 had a thickness of 100 μm, wherein: Re=270 nm; Rth=135 nm; and Nz=0.50.

The obtained retardation film 6 was laminated to the polarizing plate in such a manner that a slow axis of the retardation film 6 becomes orthogonal to the absorption of the polarizing plate, through an acrylic-based pressure-sensitive adhesive. The prepared polarizing plate was laminated to the viewing-side surface of the liquid crystal cell in the same manner as that in Inventive Example 1 to obtain a liquid crystal panel. Then, the obtained liquid crystal panel was subjected to heating, and the presence or absence of curl and brightness unevenness was checked.

Comparative Example 2

A polycarbonate-based resin having a weight-average molecular weight (Mw) of 60,000 (number average molecular weight (Mn)=33,000, Mw/Mn=1.78) was obtained through a conventional method by using phosgene as a carbonate precursor, and 2,2-bis(4-hydroxyphenyl)propane and 1,1-bis(4-hydroxyphenyl)-3,3,5-trimethylcyclohexane as aromatic dihydric phenol components. 70 weight parts of the polycarbonate-based resin and 30 weight parts of a styrene-based resin (HIMER SB75 produced by Sanyo Chemical Industries, Ltd.) having a weight-average molecular weight (Mw) of 1,300 (number average molecular weight (Mn)=716, Mw/Mn=1.78) were added into 300 weight parts of dichloromethane, and they were mixed under stirring at room temperature for 4 hours, to obtain a transparent solution. This solution was cast on a glass plate, and left at room temperature for 15 minutes. Then, the resulting coating was peeled off from the glass plate and dried in an oven at 80° C. for 10 minutes and further at 120° C. for 20 minutes, to obtain a polymer film having a thickness of 55 μm and a glass transition temperature (Tg) of 140° C.

A biaxially-stretched polypropylene film (trade name: "TORAYFAN" produced by Toray Industries Inc. (thickness: 60 μm)) was laminated to each of opposite surfaces of the above polymer film, through an acrylic-based pressure-sensitive adhesive layer (thickness: 15 μm). Subsequently, by using a roll stretching machine, the resulting film was stretched 1.27 times while longitudinal ends thereof are retained, in an air circulation constant-temperature oven at 147° C., to prepare a retardation film 7. The obtained retardation film 7 had a thickness of 55 μm, wherein: Re=270 nm; Rth=135 nm; and Nz=0.50.

The obtained retardation film 7 was laminated to the polarizing plate in such a manner that a slow axis of the retardation film 7 becomes orthogonal to the absorption of the polarizing plate, through an acrylic-based pressure-sensitive adhesive. The prepared polarizing plate was laminated to the viewing-side surface of the liquid crystal cell in the same manner as that in Inventive Example 1 to obtain a liquid crystal panel. Then, the obtained liquid crystal panel was subjected to heating, and the presence or absence of curl and brightness unevenness was checked.

Comparative Example 3

By using a water-based adhesive, a 25 μm-thick hard coat-treated TAC film and the retardation film 1 were laminated, respectively, to one surface and the other surface of a 16 μm-thick polarizer. The prepared polarizing plate was laminated to the viewing-side surface of the liquid crystal cell in the same manner as that in Inventive Example 1 to obtain a liquid crystal panel. Then, the obtained liquid crystal panel was subjected to heating, and the presence or absence of curl and brightness unevenness was checked.
(Measurement of Transmittance and Polarization Degree of Polarizer)

A single transmittance T, a parallel transmittance Tp and a crossed transmittance Tc of a polarizer was measured using a UV-visible spectrophotometer (V7100 produced by JASCO Corporation). As used therein, the term "parallel transmittance" means a transmittance measured when two polarizers having the same structure are laminated such that absorption axes thereof become parallel to each other, and the term "crossed transmittance" means a transmittance measured when the two polarizers having the same structure are laminated such that the absorption axes thereof become orthogonal to each other. On the other hand, the term "single transmittance" means a transmittance of a single polarizer. Each value of T, Tp and Tc is a Y value measured by the 2-degree visual field (C light source) of JIS Z8701 and corrected for spectral luminous efficacy. The measurement was performed in a state in which a protective layer (acrylic-based resin film or cycloolefin-based resin film) was laminated to the polarizer in order to facilitate handling of the polarizer. Light absorption of the protective layer is negligibly small as compared to light absorption of the polarizer. Thus, a transmittance of a laminate obtained by laminating the protective layer to the polarizer was determined as a transmittance of the polarizer.

The polarization degree P is derived from the following formula by using the above parallel transmittance and crossed transmittance.

Polarization degree $P$ (%)=$\{(Tp-Tc)/(Tp+Tc)\} \times (\frac{1}{2}) \times 100$ (Evaluation of Orientation Function of PVA)

A Fourier Transform Infrared Spectrometer (FT-IR) (trade name: "SPECTRUM 2000" produced by Perkin Elmer, Inc.) was used as the measurement device. Polarized light as a measurement target light was measured in an attenuated total reflection (ATR) mode of to evaluate a surface of a PVA resin layer. An orientation function was calculated in the following manner. The polarized light was measured at 0 degree and 90 degrees with respect to a stretching direction. The orientation function was calculated by the following formula 1 using an absorption intensity at 2941 cm$^{-1}$ in the measured spectrum. The following intensity I was calculated using a peak at 3330 cm$^{-1}$ as a reference peak, i.e., as a value of the intensity at 2941 cm$^{-1}$/the intensity at 3330 cm$^{-1}$. In the formula 1, perfect orientation is achieved when f=1, and random orientation is achieved when f=0. Further, the peak at 2941 cm$^{-1}$ is considered to be absorption arising from vibration of the main chain (—CH$_2$—) of PVA.

$$f = (3\langle\cos 2\theta\rangle - 1)/2 \quad \text{(Formula 1)}$$
$$= (1-D)/[c(2D+1)],$$

where:
$c=(3 \cos 2\beta - 1)/2$;
$\beta=90$ deg $\Rightarrow f=-2 \times (1-D)/(2D+1)$;
θ: molecular chain.stretching direction;
β: molecular chain.transition dipole moment;
$D=(I\perp)/(I//)$ (A value of D becomes larger as PVA is more highly oriented)
$I\perp$: an absorption intensity measured when polarized light is entered in a direction perpendicular to the stretching direction; and
$I//$: an absorption intensity measured when polarized light is entered in a direction parallel to the stretching direction.
(Measurement of Retardation)

A retardation value of a retardation film was measured using a measuring apparatus (trade name: KOBRA-WPR produced by Oji Scientific Instruments). The in-plane refractive index difference Δnxy is calculated by dividing Re by a film thickness d, wherein Re is defined by the following formula: e=(nx−ny)×d. The thickness-directional retardation Rth is defined by the following formula: Rth=(nx−nz)×d.
(Measurement of Thickness)

Respective thicknesses of a polarizing film and a protective layer were measured using a digital micrometer (KC-351C produced by ANRITSU Corporation). A thickness of a retardation film was measured using a thin film spectrophotometer (trade name: MCPD 2000) produced by Otsuka Electronics Co., Ltd.
(Measurement of Photoelastic Coefficient)

A retardation value (23° C.) was measured at a center of a sample (size: 2 cm×10 cm) by applying a stress (5 to 15 N) to the sample while clamping opposite ends of the sample, and a photoelastic coefficient was calculated from a slope of a function of the stress and the retardation value, using a photometric ellipsometer (product name "M-220" produced by JASCO Corporation).

Based on results of Inventive Examples and Comparative Examples, in order to prevent the occurrence of curl in a structure obtained by laminating a polarizing film such as a polarizer or a retardation film to an IPS liquid crystal display panel, for example, the polarizer 103 in the embodiment depicted in FIG. 1 can be configured to contain iodine in a concentration of 3 weight % or more with respect to the polyvinyl alcohol-based resin, and have a PVA molecular orientation property of 0.38 or more and a polarization degree of 99.8% or more. Further, the retardation film 101 is formed as a single-layer film having a thickness d of 20 µm or less and exhibiting a refractive index distribution in which refractive indexes nx, ny, nz in respective directions of an x-axis, a y-axis and a z-axis satisfy the following relationships: nx>nz>ny, wherein the retardation film exhibits: an in-plane refractive index difference Δnxy of $5.5 \times 10^{-3}$ or more; Re of 100 to 300 nm, preferably, 130 to 300 nm, particularly preferably, 250 to 290 nm (where Re is defined by the following formula: Re=(nx−ny)×d); Nz of 0.3 to 0.8, preferably, 0.35 to 0.75, particularly preferably, 0.4 to 0.6 (where Nz is defined by the following formula: Nz=(nx−nz)/(nx−ny)); and a photoelastic coefficient of $5 \times 10^{-11}$ or more, preferably, $1 \times 10^{-10}$ or more, and wherein the retardation film has a slow axis in a width direction perpendicular to the longitudinal direction.

In addition, considering the results of Inventive Examples and Comparative Examples, in order to prevent curl, for example, in the liquid crystal cell (T/P) 201 serving as a liquid crystal display panel when the IPS liquid crystal display device 200 according to the embodiment depicted in FIG. 2 is constructed by applying an optical film laminate comprising the polarizer and the retardation film having the above features to an IPS liquid crystal display panel, as an example, on a backlight side of the IPS liquid crystal display panel, a distance from a backlight-side surface of the IPS liquid crystal display panel to a backlight-side surface of a backlight-side polarizer can be set to 50 µm or less, and a difference between a distance from a viewing-side surface of the IPS liquid crystal display panel and a protective layer-side surface of a viewing-side polarizer and the distance from the backlight-side surface of the IPS liquid crystal display panel to the backlight-side surface of the backlight-side polarizer can be set to 10 µm or less.

Further, the IPS liquid crystal display devices according to the other embodiments depicted in FIGS. 3 to 5 can also be constructed to have the same features as those described above.

Although the present invention has been particularly shown and described with reference to specific embodiments thereof, it is to be understood that various changes and modifications will be apparent to those skilled in the art. Therefore, the present invention is not limited by detailed of the depicted embodiments, but defined only by the appended claims and their legal equivalents.

LIST OF REFERENCE SIGNS

100: optical film laminate
101, 204, 304, 412, 512: retardation film
103, 207, 216, 307, 316: polarizer
404, 415, 504, 515: polarizer
104, 206, 208, 215, 217, 306, 308, 315, 317: adhesive layer
405, 414, 416, 505, 514, 516: adhesive layer
105, 209, 214, 218, 309, 314, 318: protective film
406, 417, 506, 517: protective film
106, 202, 213, 219, 302, 313, 319: pressure-sensitive adhesive layer
402, 410, 418, 502, 510, 518: pressure-sensitive adhesive layer
107: release film
200, 300, 400, 500: IPS liquid crystal display device
201, 401: liquid crystal cell (T/P)
203, 205, 303, 305, 411, 413, 511, 513: undercoating layer
210, 407: surface-treated (electrically-conductive) layer
310, 507: surface-treated layer
211, 311, 408, 508: inter-layer filling layer
212, 312, 409, 509: glass
220, 320, 419, 519: brightness enhancement film
221, 321, 420, 520: diffusion plate
222, 322, 421, 521: backlight
301, 501: liquid crystal cell
323, 522: touch panel
403, 503: coating or protective layer

The invention claimed is:
1. A continuous optical film laminate for an IPS liquid crystal display device, comprising:
a polyvinyl alcohol (PVA)-iodine based polarizer in the form of a continuous web, comprising a polyvinyl alcohol-based resin layer stretched in a longitudinal direction thereof to have a thickness of 12 µm or less, and iodine adsorbed on a PVA molecular chain oriented in the stretching direction of the polyvinyl alcohol-based resin layer in the form of a PVA-polyiodine ion complex;
a retardation film in the form of a continuous web, laminated to one surface of the polarizer through only a first adhesive layer;
a first pressure-sensitive adhesive layer disposed on a surface of the retardation film on a side opposite to the polarizer;
a release film in the form of a continuous web, laminated to a surface of the first pressure-sensitive adhesive layer on a side opposite to the retardation film; and
a protective layer laminated to the other surface of the polarizer on a side opposite to the retardation film through a second adhesive layer;
wherein:
the polarizer contains iodine in a concentration of 3 weight % or more with respect to the polyvinyl alcohol-based resin, and has a PVA molecular orientation property of 0.38 or more and a polarization degree of 99.8% or more;
the retardation film is formed as a single-layer film having a thickness d of 20 µm or less and exhibiting a refractive index distribution in which refractive indexes nx, ny, nz in respective directions of an x-axis, a y-axis and a z-axis satisfy the following relationships: nx>nz>ny, where: the x-axis is an in-plane direction of the retardation film along which a refractive index is maximized; the y-axis is an in-plane direction of the retardation film orthogonal to the x-axis; and the z-axis is a thickness direction of the retardation film, wherein the retardation film exhibits: an in-plane refractive index difference Δnxy of $5.5 \times 10^{-3}$ or more; Re of 100 to 300 nm (where Re is defined by the following formula: Re=(nx−ny)×d); Nz of 0.3 to 0.8 (where Nz is defined by the following formula: Nz=(nx−nz)/(nx−ny)); and a photoelastic coefficient of more than

$1\times10^{-10}$, and wherein the retardation film has a slow axis in a width direction perpendicular to the longitudinal direction;

each of the first and second adhesive layers has a thickness of 2 μm or less and exhibits an elastic modulus ranging from $1\times10^5$ to $3\times10^9$ Pa;

the protective layer has a thickness of 10 to 50 μm;

the retardation film is a coating film formed by a non-liquid crystalline material having a thickness-directional birefringent index (Δnxz: expressed as Δnxz=nx'−nz') of 0.0007 or more;

the nx' is a refractive index of a solidified layer formed by solidifying the non-liquid crystalline material, in an in-plane direction (slow axis direction) of the solidified layer along which the refractive index is maximized; and the nz' is a refractive index of the solidified layer in a thickness direction thereof orthogonal to both of the direction corresponding to the nx' and a direction (fast axis direction) orthogonal to the direction corresponding to the nx'.

2. The continuous optical film laminate as recited in claim 1, wherein a distance between the surface of the polarizer on the side of the protective layer and a surface of the release film on the side of the first pressure-sensitive adhesive layer is 50 μm or less.

3. A continuous optical film laminate roll prepared by winding the continuous optical film laminate as recited in claim 1, in the form of a roll.

4. An IPS liquid crystal display device comprising:
an IPS liquid crystal display panel;
a viewing-side optical film laminate comprising at least a viewing-side polarizer and a retardation film, the viewing-side optical film laminate being disposed on a viewing side of the IPS liquid crystal display panel; and
a backlight-side optical film laminate comprising at least a backlight-side polarizer and a brightness enhancement film, the backlight-side optical film laminate being disposed on a backlight side of the IPS liquid crystal display panel;

wherein:
the viewing-side optical film laminate is constructed such that:
the viewing-side polarizer includes a polyvinyl alcohol (PVA)-iodine based polarizer in the form of a continuous web, comprising a polyvinyl alcohol (PVA)-based resin layer uniaxially stretched to have a thickness of 12 μm or less, and iodine adsorbed on a PVA molecular chain oriented in the stretching direction of the polyvinyl alcohol-based resin layer in the form of a PVA-polyiodine ion complex; the viewing-side polarizer containing iodine in a concentration of 3 weight % or more, and having a PVA molecular orientation property of 0.38 or more and a polarization degree of 99.8% or more; and the retardation film is formed as a single-layer film having a thickness d of 20 μm or less and exhibiting a refractive index distribution in which refractive indexes nx, ny, nz in respective directions of an x-axis, a y-axis and a z-axis satisfy the following relationships: nx>nz>ny, where: the x-axis is an in-plane direction of the retardation film along which a refractive index is maximized; the y-axis is an in-plane direction of the retardation film orthogonal to the x-axis; and the z-axis is a thickness direction of the retardation film, wherein the retardation film exhibits: an in-plane refractive index difference Δnxy of $5.5\times10^{-3}$ or more; Re of 100 to 300 nm (where Re is defined by the following formula: Re=(nx−ny)×d); Nz of 0.3 to 0.8 (where Nz is defined by the following formula: Nz=(nx−nz)/(nx−ny)); and a photoelastic coefficient of more than $1\times10^{-10}$, and wherein the retardation film is bonded to the viewing-side polarizer through only an adhesive layer having a thickness of 2 μm or less and exhibiting an elastic modulus of $1\times10^5$ to $3\times10^9$ Pa, in such a manner that a slow axis thereof becomes substantially orthogonal to an absorption axis of the viewing-side polarizer, and further bonded to a viewing-side surface of the IPS liquid crystal display panel through a pressure-sensitive adhesive layer;

wherein, in the viewing-side surface of the IPS liquid crystal display panel, a distance from the viewing-side surface of the IPS liquid crystal display panel to a protective layer-side surface of the viewing-side polarizer on a side opposite to the retardation film is 50 μm or less; and the backlight-side optical film laminate is constructed such that:

the backlight-side polarizer comprises a polyvinyl alcohol-based resin layer uniaxially stretched to have a thickness of 12 μm or less, and iodine adsorbed on a PVA molecular chain oriented in the stretching direction of the polyvinyl alcohol-based resin layer in the form of a PVA-polyiodine ion complex, the backlight-side polarizer containing iodine in a concentration of 3 weight % or more, and having a PVA molecular orientation property of 0.38 or more and a polarization degree of 99.8% or more, wherein the backlight-side polarizer has one surface bonded to a protective layer through an adhesive layer having a thickness of 2 μm or less and exhibiting an elastic modulus ranging from $1\times10^5$ to $3\times10^9$ Pa, and wherein the protective layer is bonded to a backlight-side surface of the IPS liquid crystal display panel through a pressure-sensitive adhesive layer;

wherein, on the backlight side of the IPS liquid crystal display panel, a distance from the backlight-side surface of the IPS liquid crystal display panel to a backlight-side surface of the backlight-side polarizer is 50 μm or less;

and wherein a difference between the distance from the viewing-side surface of the IPS liquid crystal display panel and the protective layer-side surface of the viewing-side polarizer and the distance from the backlight-side surface of the IPS liquid crystal display panel to the backlight-side surface of the backlight-side polarizer is 10 μm or less;

wherein the retardation film is a coating film formed by a non-liquid crystalline material having a thickness-directional birefringent index (Δnxz: expressed as Δnxz=nx'−nz') of 0.0007 or more;

wherein the nx' is a refractive index of a solidified layer formed by solidifying the non-liquid crystalline material, in an in-plane direction (slow axis direction) of the solidified layer along which the refractive index is maximized; and wherein the nz' is a refractive index of the solidified layer in a thickness direction thereof orthogonal to both of the direction corresponding to the nx' and a direction (fast axis direction) orthogonal to the direction corresponding to the nx'.

5. The IPS liquid crystal display device as recited in claim 4, wherein the viewing-side optical film laminate comprises a protective film bonded to the surface of the viewing-side polarizer on the side opposite to the retardation film, through an additional adhesive layer.

6. The IPS liquid crystal display device as recited in claim 5, wherein the additional adhesive layer has a thickness of 2 μm or less and exhibits an elastic modulus of $1\times10^5$ to $3\times10^9$ Pa.

7. An IPS liquid crystal display device comprising:
an IPS liquid crystal display panel;
a backlight-side optical film laminate comprising at least a backlight-side polarizer and a retardation film, the backlight-side optical film laminate being disposed on a backlight side of the IPS liquid crystal display panel; and
a viewing-side optical film laminate comprising at least a viewing-side polarizer, the viewing-side optical film laminate being disposed on a viewing side of the IPS liquid crystal display panel;
wherein:
the backlight-side optical film laminate is constructed such that:
the backlight-side polarizer includes a polyvinyl alcohol (PVA)-iodine based polarizer in the form of a continuous web, comprising a polyvinyl alcohol (PVA)-based resin layer uniaxially stretched to have a thickness of 12 μm or less, and iodine adsorbed on a PVA molecular chain oriented in the stretching direction of the polyvinyl alcohol-based resin layer in the form of a PVA-polyiodine ion complex, the backlight-side polarizer containing iodine in a concentration of 3 weight % or more, and having a PVA molecular orientation property of 0.38 or more and a polarization degree of 99.8% or more; and
the retardation film is formed as a single-layer film having a thickness d of 20 μm or less and exhibiting a refractive index distribution in which refractive indexes nx, ny, nz in respective directions of an x-axis, a y-axis and a z-axis satisfy the following relationships: nx>nz>ny, where: the x-axis is an in-plane direction of the retardation film along which a refractive index is maximized; the y-axis is an in-plane direction of the retardation film orthogonal to the x-axis; and the z-axis is a thickness direction of the retardation film, wherein the retardation film exhibits: an in-plane refractive index difference Δnxy of $5.5\times10^{-3}$ or more; Re of 100 to 300 nm (where Re is defined by the following formula: Re=(nx−ny)×d); Nz of 0.3 to 0.8 (where Nz is defined by the following formula: Nz=(nx−nz)/(nx−ny)); and a photoelastic coefficient of more than $1\times10^{-10}$, and wherein the retardation film is bonded to the backlight-side polarizer through only an adhesive layer having a thickness of 2 μm or less and exhibiting an elastic modulus of $1\times10^5$ to $3\times10^9$ Pa, in such a manner that a slow axis thereof becomes substantially orthogonal to an absorption axis of the backlight-side polarizer, and further bonded to a backlight-side surface of the IPS liquid crystal display panel through a pressure-sensitive adhesive layer;
wherein, in the backlight-side surface of the IPS liquid crystal display panel, a distance from the backlight-side surface of the IPS liquid crystal display panel to a backlight-side surface of the backlight-side polarizer is 50 μm or less; and
the viewing-side optical film laminate is constructed such that:
the viewing-side polarizer comprises a polyvinyl alcohol-based resin layer uniaxially stretched to have a thickness of 12 μm or less, and iodine adsorbed on a PVA molecular chain oriented in the stretching direction of the polyvinyl alcohol-based resin layer in the form of a PVA-polyiodine ion complex, the viewing-side polarizer containing iodine in a concentration of 3 weight % or more, and having a PVA molecular orientation property of 0.38 or more and a polarization degree of 99.8% or more, wherein the viewing-side polarizer has one surface bonded to a protective layer through an adhesive layer having a thickness of 2 μm or less and exhibiting an elastic modulus ranging from $1\times10^5$ to $3\times10^9$ Pa, and wherein the protective layer is bonded to a viewing-side surface of the IPS liquid crystal display panel through a pressure-sensitive adhesive layer;
wherein, on the viewing side of the IPS liquid crystal display panel, a distance from the viewing-side surface of the IPS liquid crystal display panel to a viewing-side surface of the viewing-side polarizer is 50 μm or less;
wherein a difference between the distance from the backlight-side surface of the IPS liquid crystal display panel and the protective film-side surface of the backlight-side polarizer and the distance from the viewing-side surface of the IPS liquid crystal display panel to the viewing-side surface of the viewing-side polarizer is 10 μm or less;
wherein the retardation film is a coating film formed by a non-liquid crystalline material having a thickness-directional birefringent index (Δnxz: expressed as Δnxz=nx'−nz') of 0.0007 or more;
wherein the nx' is a refractive index of a solidified layer formed by solidifying the non-liquid crystalline material, in an in-plane direction (slow axis direction) of the solidified layer along which the refractive index is maximized; and
wherein the nz' is a refractive index of the solidified layer in a thickness direction thereof orthogonal to both of the direction corresponding to the nx' and a direction (fast axis direction) orthogonal to the direction corresponding to the nx'.

8. The IPS liquid crystal display device as recited in claim 7, wherein the backlight-side optical film laminate comprises a brightness enhancement film bonded to the surface of the backlight-side polarizer on a side opposite to the retardation film, through an acrylic-based pressure-sensitive adhesive layer.

9. The IPS liquid crystal display device as recited in claim 8, wherein the acrylic-based pressure-sensitive adhesive layer has a thickness of 2 μm or less and exhibits an elastic modulus of $1\times10^5$ to $3\times10^9$.

* * * * *